United States Patent [19]

Boehm

[11] 4,447,897
[45] May 8, 1984

[54] PRE-ASSEMBLED TWO-STAGE REACTION DEVICE FOR VACUUM BRAKE BOOSTERS

[75] Inventor: Peter Boehm, Frankfurt, Fed. Rep. of Germany

[73] Assignee: ITT Industries, Inc., New York, N.Y.

[21] Appl. No.: 380,504

[22] Filed: May 21, 1982

[30] Foreign Application Priority Data

Sep. 5, 1981 [DE] Fed. Rep. of Germany ....... 3135286

[51] Int. Cl.³ .............................................. F15G 9/10
[52] U.S. Cl. .................................. 91/369 B; 60/547.1
[58] Field of Search ...................... 91/369 B; 60/547.1

[56] References Cited

U.S. PATENT DOCUMENTS 4,233,884 11/1980 Weiler et al. ...................... 91/369 B
4,269,110 5/1981 Weiler ............................... 91/369 B Primary Examiner—Paul E. Maslousky
Attorney, Agent, or Firm—James B. Raden; Marvin M. Chaban

[57] ABSTRACT

The pre-assembled two-stage reaction device for a vacuum brake booster includes reaction levers which are in engagement with the booster movable wall at a first location and with the master cylinder push rod and a reaction plate connected thereto at a second location, with the first location being arranged radially farther out than the second location. The reaction levers are acted upon by a cup spring at a third location, with the cup spring being positioned on the side of the reaction levers adjacent a vacuum chamber and with the third location having a greater radius than the first location. A spring plate is arranged between the cup spring and the reaction levers whose circumferential collar is provided with flattened portions for the reaction levers on the side adjacent the reaction levers. To create a two-stage reaction device which can be pre-assembled and can also be employed in boosters having control housings made of thermoplastic material, there is arranged a supporting ring with two inward supporting edges upon which the reaction levers abut whose inner ends are tiltable about the supporting edges in the direction of the control valve, and with the reaction levers, the push rod with the reaction plate, the spring plate and the cup spring being retained together by the supporting ring on the one side and by a circular guide element connected thereto on the other side.

20 Claims, 2 Drawing Figures

PRE-ASSEMBLED TWO-STAGE REACTION DEVICE FOR VACUUM BRAKE BOOSTERS

BACKGROUND OF THE INVENTION

The present invention relates to a pre-assembled two-stage reaction device for vacuum brake boosters comprising a vacuum chamber in which a constant pressure prevails and a working chamber in which different pressures prevail, the chambers being separated by a movable wall; a control valve actuatable by a brake pedal and controlling the differentials of pressure acting on the movable wall; a push rod acting on a master cylinder; and reaction levers which are in engagement with the movable wall at a first location and with the push rod and a reaction plate connected thereto at a second location. The first location is disposed radially farther out than the second location, and the reaction levers are acted upon by a cup spring at a third location, with the cup spring being positioned on the side of the reaction levers close to the vacuum chamber and with the third location having a greater radius than the first location. In addition, a spring plate is positioned between the cup and the reaction levers, the spring plate having a circumferential collar with flattened portions for the reaction levers on the side adjacent the reaction levers.

From U.S. Pat. No. 3,102,453, a vacuum brake booster is already known which comprises a constant-subatmospheric pressure chamber and a working chamber in which different pressures prevail, as well as a movable wall separating the chambers and being mounted on a plunger, and a control valve which is actuatable by a brake pedal. The control valve controls the differentials of pressure acting on the movable wall. The end of the plunger adjacent the control valve includes a pin on which a plate is urged. Between the plate and the control valve, three reaction levers are positioned which on the one side bear against the movable wall radially outwardly and against a spring radially inwardly, and on the other side bear against the plate. In this arrangement, the spring is located in an opening, close to the vacuum chamber, in the valve piston of the control valve. The biasing force of the spring provides for what is termed "two-stage action" which means the retardation of the reaction force acting on the brake pedal. The magnitude of the "two-stage action" is dependent upon the strength of the reaction-delaying spring and the distances between the points of force transmission.

In the known vacuum brake booster with a two-stage reaction device, the outer ends of the reaction levers abut directly on a component associated with the control valve and rigidly connected to the movable wall. As a result, as has been explained hereinabove, the reaction levers act on the movable wall. This lever device cannot be used in devices which include a control housing made of thermoplastic material, since the latter material does not have the strength to enable the levers to be supported directly on the control housing. In addition, in this known construction, the space available is limited, which entails difficulties during the assembly.

Similar vacuum brake boosters are known from German Pat. DE-OS No. 2,822,101 and DE-OS No. 2,823,784 whose two-stage reaction devices differ from the one in U.S. Pat. No. 3,102,453 basically in that the springs are positioned on the side of the reaction levers adjacent the vacuum chamber and in that the point of engagement of the springs is located in each case outside the point of force transmission at the movable wall or at the control housing component connected thereto. However, also in these known constructions, there are encountered the above-mentioned difficulties with the use of thermoplastic material and the assembly problems.

SUMMARY OF THE INVENTION

It is, therefore, an object of the present invention to provide a pre-assembled two-stage reaction device for vacuum brake boosters of the types initially referred to which enables a control housing made of thermoplastic material to be employed in brake boosters.

A feature of the present invention is the provision of a pre-assembled two-stage reaction device for a vacuum brake booster including a movable wall separating a vacuum chamber in which a constant pressure prevails and a working chamber in which different pressures prevail, a brake pedal actuatable control valve controlling a differential of pressure acting on the movable wall and a master cylinder actuating push rod in an actuating relationship with the movable wall, the reaction device comprising a pair of reaction levers each in engagement with the movable wall on a first location thereon and in engagement with a reaction plate connected to the push-rod at a second location thereon, the first location being disposed radially farther out than the second location; a cup spring acting on each of the pair of reaction levers at a third location thereon having a greater radius than the first location, the cup spring being disposed on a side of the pair of reaction levers adjacent the vacuum chamber; a spring plate disposed between the cup spring and the pair of reaction levers, the spring plate having a circumferential collar provided with supporting surfaces for the pair of reaction levers; and a supporting ring having two inward supporting edges each abutting a different one of the pair of reaction levers on a surface thereof remote from the reaction plate, inner ends of the pair of reaction levers being tiltable about the two supporting edges in a direction of the control valve, the pair of reaction levers, the push rod with the reaction plate, the spring plate and the cup spring are retained in an assembly by the supporting ring disposed on one side thereof and a circular guide element disposed on the other side thereof and connected to the supporting ring.

The solution embodying the invention creates a pre-assembled two-stage reaction device for vacuum brake boosters which permits all-round employment and precludes assembly problems. The entire lever device can be pre-assembled in a fashion economizing production time. The pre-assembled unit may then be fitted to the brake booster where it is secured by indentations in a known way. According to the invention, the boosting force is transmitted from the diaphragm plate to the supporting ring directly. As a result, the control housing is subjected to pressure load at the clamping collar only.

In an advantageous embodiment of the present invention, the supporting ring includes inwardly two axially extending projections between which the reaction levers are interposed. The axially extending projections serve as an inner guide for the reaction levers, and they prevent in addition a wrong insertion of the supporting ring. In addition, the projections make visible the correct positioning of sides prior to the assembly, thus eliminating the risk of wrong fitting.

In another advantageous embodiment, the radially outward guiding of the reaction levers will be obtained by the spring plate containing two axially extending projections which engage in recesses of the reaction levers and whose length is less than the thickness of the reaction levers. Since the projections are shorter than the thickness of the reaction levers, the spring plate is able to take support on the levers. This arrangement serves simultaneously to secure the spring plate in the correct position. Different magnitudes of two-stage operation can be achieved by the use of different spring plates.

In another embodiment, the reaction plate includes axially extending lateral projections having the reaction levers positioned therebetween. Expediently, there are provided four lateral projections in this arrangement, each two of the projections being arranged on one side of the reaction plate spaced from one another, while the axial projections of the supporting ring engage in each case between the projections of the reaction plate. This enables to further improve the guiding and positioning.

To connect the guide element to the supporting ring, according to a favorable embodiment, the guide element includes at least two retaining projections which extend axially at the circumference and which can be folded in particular around indentations on the underside of the supporting ring.

For accommodating the cup spring, the spring plate, the reaction plate and the reaction levers, the guide element may be of bowl-like construction. However, it is also possible to construct the guide element not in a bowl-like fashion but as a plane disc. In this case, the pipes that are already available will take care of the radial guiding. Both variants enable an adjustment of the spring force of the cup spring.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
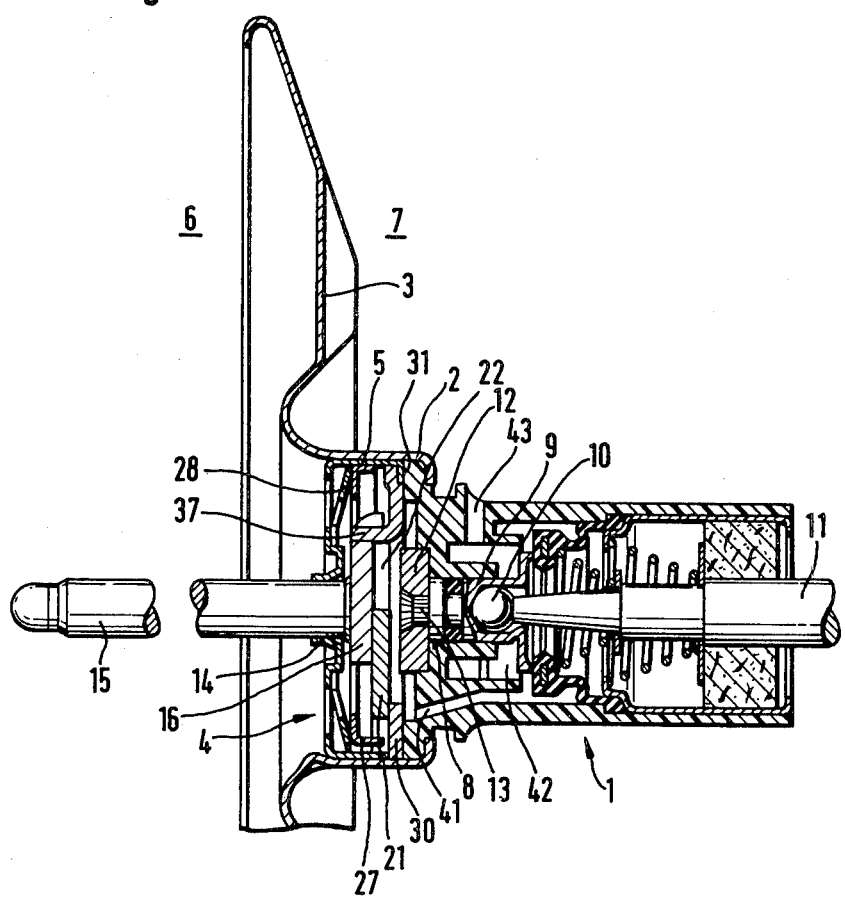
FIG. 1 is a longitudinal cross-sectional view in two planes disposed at right angles to one another through a vacuum brake booster with a pre-assembled two-stage reaction device in accordance with the principles of the present invention.
Figure 2:
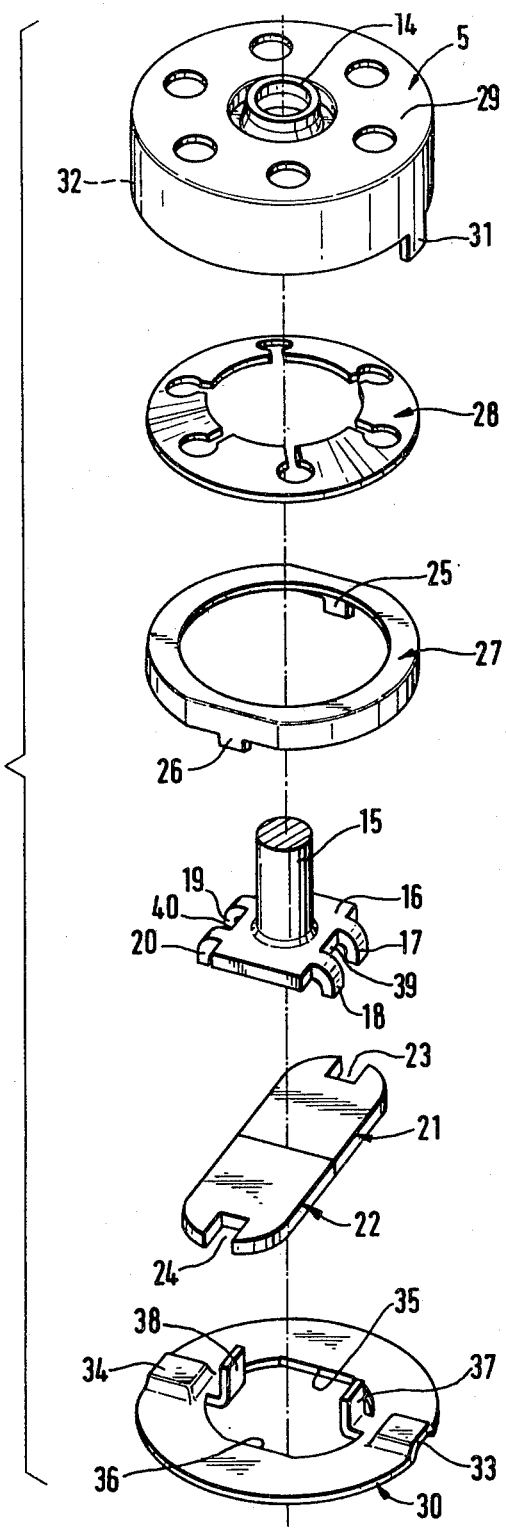
FIG. 2 is an exploded view of the components of the pre-assembled two-stage reaction device of FIG. 1.

Referring to FIGS. 1 and 2, the control housing 1 is secured by a neck 2 to a diaphragm plate 3 separating a vacuum chamber 6 and a working chamber 7. Neck 2 accommodates a two-stage reaction device 4. A valve piston 9 is guided in a coaxial bore 8 in control housing 1. On its one end, the valve piston 9 receives a ball-shaped end 10 of a piston rod 11, while the other end of the valve piston 9 carries a stop ring 12 limiting the axial movement of valve piston 9 in the direction of piston rod 11. A valve-piston cushioning member 13 is arranged in the middle of the front end of valve piston 9 adjacent the two-stage reaction device 4.

Arranged on the side of the diaphragm plate 3 adjacent vacuum chamber 6 is the two-stage reaction device 4. The latter contains a bowl-like guide element 5 which is provided with a guide sleeve 14 extending coaxially with the valve piston 9 and guiding a push rod 15 therein which acts upon the piston of a master cylinder (not shown). A reaction plate 16 is fitted to the end of push rod 15. The coupling of push rod 15 to the reaction plate 16 is carried out suitably by pressure welding. However, there is also possible a construction which is not welded, since the reaction plate 16, as will be described hereinbelow, is already radially fixed. As best seen in FIG. 2, the reaction plate 16 is of rectangular shape and has at each of its longitudinal sides two axially extending projections 17, 18 and 19, 20 spaced from one another. Positioned between these projections 17, 18, 19 and 20 are two substantially rectangular reaction levers 21 and 22 which are, however, rounded off at their outer sides. The flat reaction levers 21 and 22 include on their narrow outer sides recesses 23 and 24 which engage axially extending projections 25 and 26 on the periphery of an annular spring plate 27 which encloses reaction plate 16.

The one side of a cup spring 28 bears against the spring plate 27. The spring force of cup spring 28 is transmitted onto reaction levers 21 and 22 through flattened portions of the spring plate collar in which are likewise integrated projections 25 and 26. The other side of cup spring 28 abuts on the inside bottom wall 29 of the bowl-like guide element 5. Bottom wall 29 represents the end of the two-stage reaction device subassembly 4 on the master cylinder side. The end of the two-stage reaction device 4 on the control valve side is formed by a supporting ring 30 which is connectible to the guide element 5. For this purpose, the guide element 5 possesses two retaining projections 31 and 32 which extend axially at the circumference and are able to be folded around indentations 33 and 34 on the bottom side of supporting ring 30. Supporting ring 30 includes inwardly two opposite supporting edges 35 and 36 about which reaction levers 21 and 22 are tiltable. Set off by 90°, there are provided inwardly two opposing, axially extending projections 37 and 38 between which reaction levers 21 and 22 are positioned and which extend into the gaps 39 and 40 formed between projections 17 and 18 and 19 and 20, respectively, of reaction plate 16.

In the embodiment shown, the bowl-like guide element 5 takes care of the radial guiding of supporting ring 30, reaction levers 21 and 22, spring plate 27 and cup spring 28. It is, however, possible to replace the bowl-like guide element 5 by a guide element having the shape of a plane disc. In this case, pipes that are already available will adopt the function of radial guiding. Both variants enable to pre-assemble the two-stage reaction device 4, which pre-assembled unit may then be fitted to the brake booster and secured there in a known fashion, for example, by indentations.

The mode of operation of the pre-assembled two-stage reaction device will now be described.

In the inactivated position of the brake booster, vacuum chamber 6 and working chamber 7 are in communication with each other through openings 41 and 42 in the control housing 1 and sealed relative to the outside. The valve piston 9 is in its end position adjacent working chamber 7. A subatmospheric pressure prevails in both chambers 6 and 7. The push rod 15 is in its end position adjacent vacuum chamber 6 with the force of cup spring 28 maintaining reaction levers 21, 22 in such a position that they are in abutment with reaction plate 16.

When the brake pedal is depressed, piston rod 11 will displace valve piston 9 in the direction of reaction levers 21 and 22 until the connection between openings 41 and 42 is closed by a valve, while at the same time a connection of working chamber 7 to atmospheric pressure is established through the openings 43 and 41. To achieve this, valve piston 9 is required to travel a short distance only. The differential between the pressures prevailing in chambers 6 and 7 causes diaphragm plate 3 to move in the direction of vacuum chamber 6 and to act upon the master cylinder by means of push rod 15. As a result of the pressure developing in the master cylinder, a force will act upon push rod 15 which counteracts the direction of movement of diaphragm plate 3. There occurs a movement of push rod 15 relative to diaphragm plate 3 and control housing 1, respectively, with reaction plate 16 being urged against reaction levers 21 and 22. The reaction levers assume a co-planar condition as shown in FIGS. 1 and 2. The ends of the levers press against ring 30. The spring 28 also presses against the levers at the outer radial distance to prevent the levers from collapsing into a V configuration. With the lever co-planar, the levers rest against ring 30 which abuts against the housing so the resulting force is transmitted onto control housing 1 and, thus, cannot be felt at the brake pedal. In this arrangement, the magnitude of the reaction force acting upon control housing 1 is determined by the strength of cup spring 28, the distances between the points of engagement between reaction levers 21 and 22 and control housing 1, as well as reaction levers 21 and 22 and reaction plate 16 and by the point of transmission of the force of cup spring 28 at reaction levers 21 and 22.

If the actuating force at the brake pedal is increased to such an amount that cup spring 28 is unable to absorb the reaction force completely, reaction levers 21 and 22 will pivot about the sharp supporting edges 35 and 36 and their inner ends enter in interaction with valve piston 9. The reaction force can then be felt at the brake pedal. With the actuating force continuing to increase, valve piston 9 will urge reaction levers 21 and 22 into flat engagement with reaction plate 16, thus, acting upon push rod 15 and the master-cylinder piston.

While I have described above the principles of my invention in connection with specific apparatus, it is to be clearly understood that this description is made only by way of example and not as a limitation to the scope of my invention as set forth in the objects thereof and in the accompanying claims.

I claim:
1. A two-stage reaction device for insertion into a vacuum brake booster including a movable wall separating a vacuum chamber in which a constant pressure prevails and a working chamber in which different pressures prevail, a brake pedal actuatable control valve controlling a differential of pressure acting on said movable wall and a master cylinder actuating push rod in an actuating relationship with said movable wall, said reaction device comprising:
   a pair of reaction levers each aligned to be coupled to said movable wall on a first location thereof and in engagement with a reaction plate connected to said push rod at a second location thereon, said first location being disposed radially farther out than said second location;
   a cup spring acting on each of said pair of reaction levers at a third location thereon having a greater radius than said first location, said cup spring being disposed on a side of said pair of reaction levers adjacent said vacuum chamber;
   a spring plate disposed between said cup spring and said pair of reaction levers, said spring plate having a circumferential collar provided with supporting surfaces for said pair of reaction levers; and
   a supporting ring having two inward supporting edges each abutting a different one of said pair of reaction levers on a surface thereof remote from said reaction plate, inner ends of said pair of reaction levers being tiltable about said two supporting edges in a direction of said control valve, wherein said pair of reaction levers, said push rod with said reaction plate, said spring plate and said cup spring are retained in an assembly by said supporting ring disposed on one side thereof and a circular guide element disposed on the other side thereof and connected to said supporting ring.
2. A reaction device according to claim 1, wherein said supporting ring includes inwardly two axially extending projections between which said pair of reaction levers are disposed.
3. A reaction device according to claim 2, wherein said spring plate includes two axially extending projections extending from said circumferential collar thereof each engaging a recess disposed in an outer end of a different one of said pair of reaction levers to provide said supporting surfaces, each of said two spring plate projections having a length less than the thickness of said pair of reaction levers.
4. A reaction device according to claim 3, wherein said reaction plate includes axially extending lateral projections between which said pair of reaction levers are positioned.
5. A reaction device according to claim 4, wherein said lateral projections number four, each two of said lateral projections being disposed on a different side of said reaction plate and spaced a distance from one another to sandwich an associated one of said two supporting ring axial projections therebetween.
6. A reaction device according to claim 5, wherein said guide element includes at least two retaining projections extending axially from the circumference thereof, said two retaining projections being connectible to said supporting ring.
7. A reaction device according to claim 6, wherein said two retaining projections are foldable to engage indentations on the underside of said supporting ring to provide a connection with said supporting ring to enclose said unitary assembly.
8. A reaction device according to claims 1, 2, 3, 4, 5, 6 or 7, wherein
   said guide element is of bowl-like construction.
9. A reaction device according to claim 1, wherein
   said spring plate includes two axially extending projections extending from said circumferential collar thereof each engaging a recess disposed in an outer end of a different one of said pair of reaction levers to provide said supporting surfaces, each of said two spring plate projections having a length less than the thickness of said pair of reaction levers.
10. A reaction device according to claim 9, wherein said reaction plate includes axially extending lateral projections between which said pair of reaction levers are positioned.
11. A reaction device according to claim 10, wherein said lateral projections number four, each two of said lateral projections being disposed on a different side of said reaction plate and spaced a distance from one another to sandwich an associated one of said two supporting ring axial projections therebetween.

12. A reaction device according to claim 11, wherein said guide element includes at least two retaining projections extending axially from the circumference thereof, said two retaining projections being connectible to said supporting ring.

13. A reaction device according to claim 12, wherein said two retaining projections are foldable to engage indentations on the underside of said supporting ring to provide a connection with said supporting ring.

14. A reaction device according to claim 1, wherein said reaction plate includes axially extending lateral projections between which said pair of reaction levers are positioned.

15. A reaction device according to claim 14, wherein said lateral projections number four, each two of said lateral projections being disposed on a different side of said reaction plate and spaced a distance from one another to sandwich an associated one of said two supporting ring axial projections therebetween.

16. A reaction device according to claim 15, wherein said guide element includes at least two retaining projections extending axially from the circumference thereof, said two retaining projections being connectible to said supporting ring.

17. A reaction device according to claim 16, wherein said two retaining projections are foldable to engage indentations on the underside of said supporting ring to provide a connection with said supporting ring.

18. A reaction device according to claim 1, wherein said guide element includes at least two retaining projections extending axially from the circumference thereof, said two retaining projections being connectible to said supporting ring.

19. A reaction device according to claim 18, wherein said two retaining projections are foldable to engage indentations on the underside of said supporting ring to provide a connection with said supporting ring.

20. A reaction device according to claims 9, 10, 11, 12, 13, 14, 15, 16, 17, 18, or 19, wherein said guide element is of bowl-like construction.

* * * * *